United States Patent
Van Der Wal et al.

(10) Patent No.: US 7,710,940 B2
(45) Date of Patent: May 4, 2010

(54) SYNCHRONISATION OF MOBILE EQUIPMENT IN TIME DIVISION DUPLEX CDMA SYSTEM

(75) Inventors: Arnoud Van Der Wal, Napier (NZ); Jan Stoter, Hengelo (NL); Johan Van De Hee, Boxmeer (NL)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 789 days.

(21) Appl. No.: 10/492,627

(22) PCT Filed: Oct. 16, 2001

(86) PCT No.: PCT/NL01/00762

§ 371 (c)(1),
(2), (4) Date: Oct. 18, 2004

(87) PCT Pub. No.: WO03/039043

PCT Pub. Date: May 8, 2003

(65) Prior Publication Data

US 2005/0053048 A1    Mar. 10, 2005

(51) Int. Cl.
    *H04J 3/06* (2006.01)
(52) U.S. Cl. .................................................. 370/350
(58) Field of Classification Search ................ 370/350, 370/520, 503
    See application file for complete search history.

(56) References Cited

U.S. PATENT DOCUMENTS

| | | | | |
|---|---|---|---|---|
| 4,740,962 A * | 4/1988 | Kish, III | ............ | 370/514 |
| 5,533,028 A * | 7/1996 | Hita de la Torre et al. | ... | 370/347 |
| 5,625,627 A * | 4/1997 | Ishi | ............ | 370/347 |
| 5,748,622 A * | 5/1998 | Garcia Vacas | ............ | 370/337 |
| 5,754,605 A * | 5/1998 | Chong et al. | ............ | 375/368 |
| 5,953,311 A * | 9/1999 | Davies et al. | ............ | 370/210 |
| 6,031,828 A * | 2/2000 | Koro et al. | ............ | 370/336 |
| 6,128,288 A * | 10/2000 | Miya | ............ | 370/335 |
| 6,377,565 B1 * | 4/2002 | Puckette, IV | ............ | 370/337 |
| 6,754,170 B1 * | 6/2004 | Ward | ............ | 370/208 |
| 6,804,312 B1 * | 10/2004 | Win et al. | ............ | 375/347 |
| 7,058,006 B2 * | 6/2006 | Sudo et al. | ............ | 370/208 |

(Continued)

OTHER PUBLICATIONS

"3rd Generation Partnership Project; Technical Specification Group Radio Access Network; Physical Layer Procedures (TDD) (Release 4)"; 3GPP TS 25.224 V4.10 (Jun. 2001); XP002205701; Annex C (p. 36).

(Continued)

*Primary Examiner*—George Eng
*Assistant Examiner*—Christopher M Brandt

(57) ABSTRACT

Method for synchronising mobile equipment in a CDMA system comprising a plurality of base stations (11) for communicating with the mobile equipment (12). The base stations (11) are mutually synchronised, and each base station (11) has a synchronisation channel transmit timing offset within a synchronisation time slot (20). The method comprises the step of synchronising the mobile equipment (12) by matching a synchronisation code in the synchronisation time slot (20). Also the following steps are executed by the method: scanning a base radio signal (13) during at least one frame (15) for detecting a signal portion with predetermined characteristics, such as received power peaks (23), the signal portion not being the synchronisation code; deriving timing information associated with the CDMA system from the signal portion; and starting the synchronisation step of the mobile equipment (12) using the timing information.

11 Claims, 2 Drawing Sheets

U.S. PATENT DOCUMENTS

| | | | | |
|---|---|---|---|---|
| 7,088,795 | B1 * | 8/2006 | Aiello et al. | 375/356 |
| 2002/0057664 | A1 * | 5/2002 | Sarkar | 370/342 |
| 2002/0075833 | A1 * | 6/2002 | Dick et al. | 370/336 |
| 2002/1009770 | * | 7/2002 | Sezgin et al. | 370/347 |

OTHER PUBLICATIONS

"Evaluation of Synchronisation Codes"; Chapter 8.3; TS25.223 v4.1.0 (Jun. 2001).

European Telecommunications Standard Institute (ETSI): "Universal Mobile Telecommunications System (UMTS); UMTS Terrestrial Radio Access (UTRA); Concept Evaluation (UMTS 30.06 version 3.0.0)" TR 101 146 V3.0.0, Dec. 1997, XP002131073; Valbonne, FR; paragraph 2.6.4.1.

* cited by examiner

SYNCHRONISATION OF MOBILE EQUIPMENT IN TIME DIVISION DUPLEX CDMA SYSTEM

The present-invention relates to synchronisation of mobile equipment in a time division duplex CDMA (Code Division Multiple Access) system. In a first aspect, the present invention relates to a method for synchronising mobile equipment in a CDMA system comprising a plurality of base stations for communicating with the mobile equipment, the base stations being mutually synchronised, each base station having a synchronisation channel transmit timing offset within a synchronisation time slot, the method comprising the step of synchronising the mobile equipment by matching a synchronisation code in the synchronisation time slot.

Synchronisation of mobile equipment (or mobile stations) in TDD-CDMA systems is being effectuated by having the mobile equipment search for a specific code in a received radio signal from one or more base stations (hence code division multiple access). This is e.g. described in 3GPP/ETSI publication TS 25.224 'Universal Mobile Telecommunications System (UMTS); Physical Layer Procedures (TDD)' Annex C, June 2001. The radio signal, or air interface, is characterised as a time duplex radio signal. Initially, a mobile device or mobile equipment is completely unaware of the timing of the TDD-CDMA system. The mobile device searches for a match with a specific code for at least the duration of one frame. The disadvantage of the code search is that there is always a chance of a false match being found, resulting in a new search that has to be performed, which requires additional time.

The present invention seeks to provide a method, which allows a more efficient synchronisation of the mobile equipment.

For that, the present invention provides a method of the type defined in the preamble above, in which the method comprises the steps of scanning a base radio signal during at least one frame for detecting a signal portion with predetermined characteristics, one of the characteristics, being received signal strength, the characteristics excluding the synchronisation code as such, deriving timing information associated with the CDMA system from the signal portion, starting the synchronisation step of the mobile equipment using the timing information. This will allow to start the synchronisation step, in which a code match is searched (e.g. using matching filters), on a very efficient time in the frame.

The signal portion being scanned for in the radio signal may in a first embodiment be the received power of the base station signal as received by the mobile equipment, such as the received signal strength indicator (RSSI). The method may then further comprise the steps of making a list of all received power or RSSI peaks and associated time of occurrence in the at least one frame, the received power or RSSI peaks having a time period of less then a predetermined number of chips, e.g. 300, and an amplitude step of more than a predetermined value, e.g. 3 dB and selecting the highest peak of the list and starting a first synchronisation search just before occurrence of the highest peak. The received radio signal in the mobile equipment or mobile station has a distinct power over time signal in a TDD-CDMA system, as the synchronisation time slot is fixed within the radio frame, and every base station uses a different timing offset to start the synchronisation signal in the synchronisation time slot. This allows detecting these synchronisation signals as distinct peaks in the power envelope of the radio signal.

In a further embodiment, the mobile equipment also selects the strongest base station signal based on the received power or RSSI information, next to only deriving timing information. This allows for a more efficient start phase of mobile equipment entering a TDD-CDMA system.

In a further embodiment, the signal portion is the guard period of the base station signal. Every time slot of the radio frame has a fixed structure comprising a data block, a mid amble, a second data block and a guard period. In the guard period which has a predetermined length (e.g. 96 chips of the 2560 chips, or 0.667 μsec in every time slot), no signal power is present, which allows this guard period to be detected. As the guard period has a fixed position within each timeslot, and the synchronisation channel has a fixed position within each frame, the frame and time slot timing information may be derived or calculated from the guard period timing information. This then allows starting the synchronisation of the mobile equipment to start at an optimal moment in time, lowering the chance of a false match of the synchronisation code. Also in this further embodiment, the method may comprise the further step of selecting a channel associated with the strongest synchronisation match.

Also, further cell parameters may be derived based on the timing information, see e.g. TS25.223 v4.1.0 (June 2001), chapter 8.3 'Evaluation of Synchronisation Codes'.

The method may comprise the further step of controlling a timing oscillator of the mobile equipment using the derived timing information. This allows to start up the mobile equipment in the TDD-CDMA system in a more efficient and less time consuming way.

The present invention may be advantageously used in TDD-CDMA systems, such as the UTRA-TDD (UMTS, or Universal Mobile Telecommunications System, Terrestrial Radio Access) system and/or TD-SCDMA (Time Division Synchronous Code Division Multiple Access) system as known to the person skilled in the art.

In a further aspect the present invention relates to mobile equipment for use in a CDMA system, the mobile equipment comprising processing means, memory means and transceiver means for receiving and transmitting CDMA signals, the memory means and transceiver means being connected to the processing means, and the processing means being arranged to perform the steps of the present method.

In an even further aspect, the present invention relates to a software program product which is loadable on equipment having processing means, the software program comprising instructions to allow the processing means to execute the steps of the present method. The present invention also relates to a data carrier, such as a recording medium or transfer medium, comprising the present software program product.

The present invention will now be discussed in more detail using an exemplary embodiment, with reference to the attached drawings in which FIG. 1 shows a block diagram of a mobile communication system in which the present invention may be used;

Figure 1:
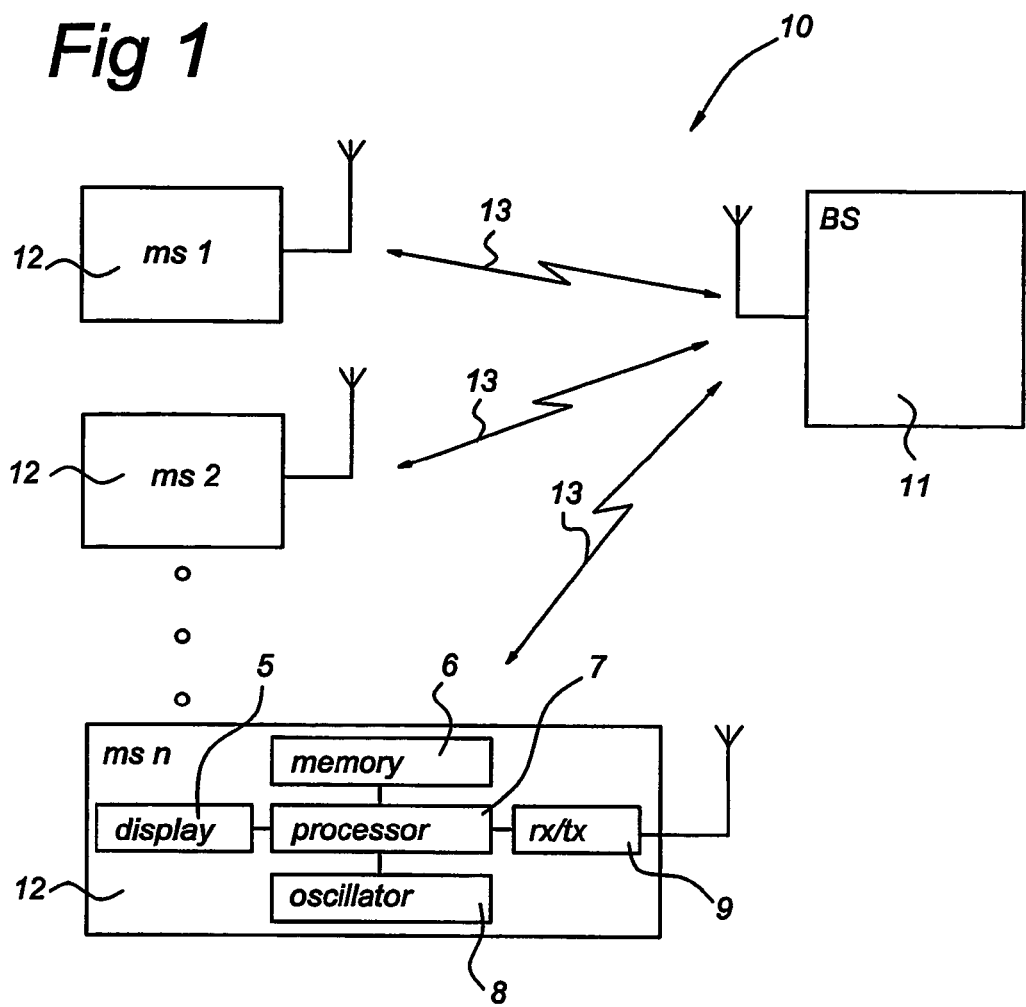

In FIG. 1 a general simplified diagram is shown of a TDD-CDMA system 10 for mobile communications. A number of mobile stations 12 (MS 1 ... MS N), or mobile equipment, are able to communicate with a base station 11 by means of a radio frequency signal 13. The TDD-CDMA system 10 uses Code Division Multiple Access and Time Division Duplex to assign channels to one of the communication links 13. Although only one base station 11 is shown in FIG. 1, it will be clear that in the TDD-CDMA system 10, a large number of base stations 11 are present which each have a certain geographical coverage area or cell.

Figure 2:
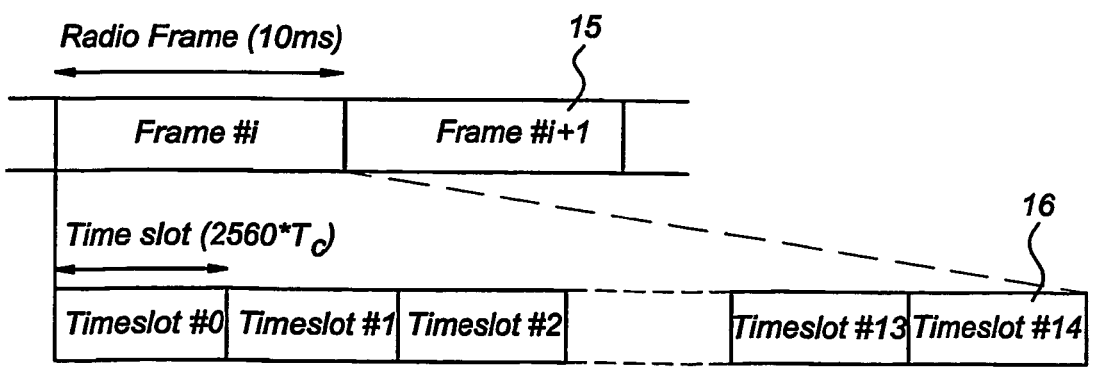
FIG. 2 shows the physical channel signal format of a TDD-CDMA system.

FIG. 2 shows the physical layer channel signal structure format of the TDD-CDMA system 10, i.e. the structure of the radio frequency signal 13. All physical channels take a three-layer structure with respect to timeslots 16, radio frames 15 and system frame numbering (SFN). Depending on the resource allocation, the configuration of radio frames 15 or timeslots 16 becomes different. The radio frame 15 is 10 msec long and comprises 15 timeslots 16 for the 3.84 Mcps system as e.g. described in ETSI publication TS 125.221 'Universal Mobile Telecommunications System (UMTS); Physical channels and mapping of transport channels onto physical channels (TDD)', June 2001. Each timeslot 16 is 667 µsec long and comprises 2560 chips (or time periods $T_c$) and is either used uplink (from mobile station 12 to base station 11) or downlink (from base station 11 to mobile station 12). Of each frame 15, at least one time slot 16 has to be allocated for the downlink, and at least one time slot 16 has to be allocated for the uplink.

The time slots 16 are used in the sense of a TDMA component to separate different user signals in the time domain. A physical channel in TDD is a burst, which is transmitted in a particular timeslot 16 within allocated Radio Frames 15. The allocation can be continuous, i.e. the time slot 16 in every frame 15 is allocated to the physical channel or discontinuous, i.e. the time slot 16 in a subset of all frames 15 is allocated only.

Figure 3:
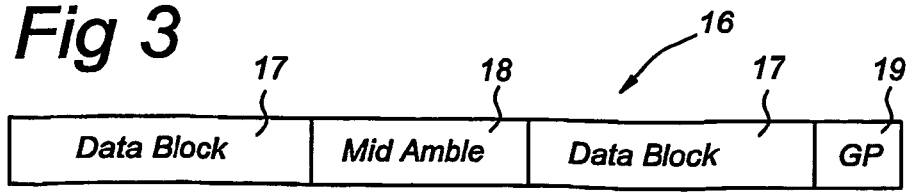
FIG. 3 shows a diagrammatic view of the structure of a single time slot as used in a TDD-CDMA system.

The general structure of each timeslot 16 is shown in FIG. 3. All channels need a guard period GP 19 in every timeslot. A burst is the combination of two data blocks 17, a midamble part 18 and a guard period 19. The duration of a burst is one time slot 16. Several bursts can be transmitted at the same time from one transmitter. In this case, the data parts must use different channelisation codes, but the same scrambling code. The midamble parts 18 are either identically or differently shifted versions of a cell-specific basic midamble code. The data part 17 of the burst is spread with a combination of channelisation code and scrambling code. The channelisation code is an orthogonal variable spreading factor (OVSF) code, that can have a spreading factor of 1, 2, 4, 8, or 16. The data rate of the physical channel is depending on the used spreading factor of the used OVSF code. The midamble part 18 of the burst can contain two different types of midambles: a short one of length 256 chips, or a long one of 512 chips. The data rate of the physical channel is depending on the used midamble length. The scrambling code and the basic midamble code are broadcast and may be constant within a cell or base station 11. Depending on the application, the guard period 19 is e.g. 96 or 192 chips long.

Figure 4:
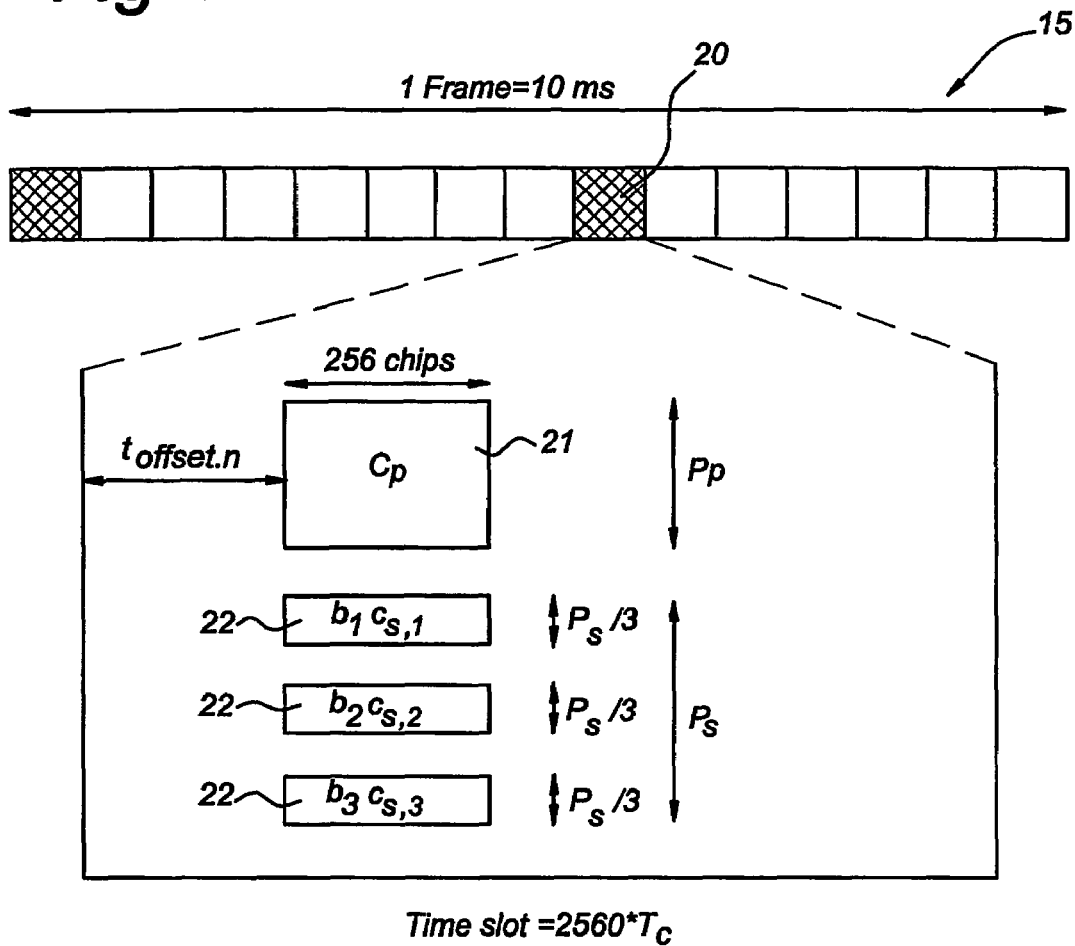
FIG. 4 shows the scheme for a synchronisation channel in a TDD-CDMA system.

In the TDD-CDMA system 10, all base stations 11 have a common time base to keep synchronisation in the TDD system. Synchronisation of mobile equipment 12 with the other parts of the TDD-CDMA system 10 is accomplished using a synchronisation channel 20. This synchronisation channel 20 is shown in FIG. 4. A mode code group of a cell can be derived from the synchronisation channel 20. In order not to limit the uplink/downlink asymmetry the synchronisation channel 20 is mapped on one or two downlink slots 16 per frame 15 only. The synchronisation channel 20 consists of a primary code sequence 21 and three secondary code sequences 22 each 256 chips long. The primary and secondary code sequences are predefined codes.

During cell search, a number of steps are performed, of which one is a synchronisation step. Other steps include determining the downlink scrambling code and the basic midamble code. During the first step of the cell search procedure, the mobile station 12 uses the primary synchronisation code 21 of the synchronisation channel 20 to find a cell. Typically this is done using a matched filter (not shown).

Due to mobile to mobile interference, it is mandatory for public TDD-CDMA systems 10 to keep synchronisation between base stations 11. As a consequence of this, a capture effect concerning the synchronisation channel 20 can arise. A time offset $t_{offset,n}$ which is chosen differently for each base station 11, is measured from the beginning of the synchronisation channel time slot 20. The time offset $t_{offset,n}$ enables the system 10 to overcome the capture effect. The time offset $t_{offset,n}$ is one of 32 values, depending on the code group of the cell, n. Note that the cell parameter will change from frame to frame, but the cell will belong to only one code group and thus have one time offset $t_{offset,n}$. The exact value for $t_{offset,n}$ is given by:

$$t_{offset,n} = \begin{cases} n \cdot 48 \cdot T_c & n < 16 \\ (720 + n \cdot 48)T_c & n \geq 16 \end{cases} ; n = 0, \ldots, 31$$

Thus, the synchronisation code will be located in the first or second data part of the timeslot 16 (see FIG. 3).

Figure 5:
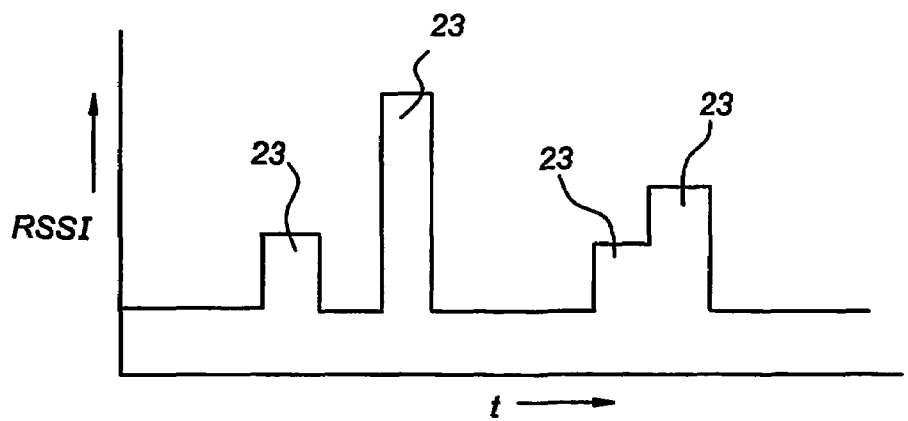
FIG. 5 shows a plot of received signal strength over time for a TDD-CDMA radio signal.

As a result, the received radio signal power at the mobile station 12 will have a distinct form in the synchronisation channel part of a received TDD-CDMA frame 15. FIG. 5 shows a possible plot of the received power (or Received Signal Strength Indicator RSSI) at the mobile station 12 over time. It can be seen that in the time period of the synchronisation channel 20 shown in FIG. 5 (which may occur once or twice in every frame 15) a number of peaks 23 occur, resulting from different base stations 11 transmitting their synchronisation code. These peaks have certain characteristics (duration of 256 chips, intervals of n times 48 chips) which make these peaks easy to detect. The mobile station 12 may be provided with special circuitry or software to detect these peaks (e.g. more than 3 dB signal difference and less then 400 chips width). Once these peaks are detected, the mobile station 12 is aware of the timing of the synchronisation channel 20 (as this is a periodic signal). Then, the mobile station 12 may start the synchronisation code search at an optimum time (e.g. just before the peak occurs) in order to minimise the chance of false matches and to optimise the search procedure (quicker synchronisation).

Also, already at this stage, the mobile station 12 may be arranged to store a list of RSSI peaks 23 and select the base station 11, which provides the strongest signal in order to obtain the best quality link 13 with the base station 1.

Returning to FIG. 1, one of the mobile stations 12 is shown in more detail as an exemplary embodiment, comprising processor means 7, such as a digital processor, signal processor or the like. The processor 7 is connected to a display 5, memory means 6 (such as random access memory and/or non-volatile memory), and an oscillator 8 providing a clock signal to the processor means 8. The processor means 7 are arranged to execute the steps as described above in relation to the present invention and to interface with a transceiver 9 which is connected to the antenna of the mobile station 12. The mobile station 12 or mobile equipment may also be arranged to use the timing information obtained from the received signal to control the operation (and synchronisation) of its own timing oscillator 8.

In a further embodiment, other periodic signal portions may be used to obtain the frame timing information (or better synchronisation channel timing information), such as the guard periods of each time slot 16 in a frame 15. This allows using the present invention in more different TDD-CDMA systems 10, such as TD-SCDMA systems or lower rate standards of TDD-CDMA (such as the 1.28 Mcps system described in ETSI TS 125.221 mentioned above). Combining the timing information of the guard space and the synchronisation channel provides additional knowledge of the frame timing, hence the timing offset is known which points to a limited range of cell parameters. This will also speed up the synchronisation process even more.

For the person skilled in the art it will be apparent that various modifications and variations to the present invention may be envisaged. The above description of exemplary embodiments are only meant as clarification and not to limit the scope of the present invention which is defined by the appended claims.

The invention claimed is:

1. A method for synchronizing mobile equipment in a CDMA system comprising a plurality of base stations for communicating with the mobile equipment, the base stations being mutually synchronized, each base station having a synchronization channel transmit timing offset within a synchronization time slot, the method comprising the steps of:
   prior to synchronizing the mobile equipment with a base station performing the following steps;
      scanning a base radio signal during at least one frame to detect a signal portion with predetermined characteristics, one of the characteristics being received signal strength, the characteristics excluding a synchronization code;
      deriving timing information associated with the CDMA system from the signal portion; and
   starting synchronization of the mobile equipment with the base station using the timing information to perform a search to match the synchronization code in the synchronization time slot, wherein:
      the signal portion is the received power of the base station signal as received by the mobile equipment; or
      the signal portion is a guard period of the base station signal.

2. The method according to claim 1, in which the method comprises the further steps of:
   making a list of all received power peaks and associated time of occurrence in the at least one frame, the received power peaks having a time period of less then a predetermined number of chips, and an amplitude step of more than a predetermined value;
   selecting the highest peak of the list and starting a first synchronization search just before occurrence of the highest peak.

3. The method according to claim 2, in which the method comprises the further step of selecting the strongest base station signal based on the received power information.

4. The method according to claim 1, in which the method further comprises the step of selecting the strongest base station signal based on the received power information.

5. The method according to claim 1, in which the method comprises the further steps of:
   deriving timing information from the guard period; and
   calculating from the timing information derived from the guard period, timing information associated with the synchronization slot.

6. The method according to claim 5, in which the method comprises the further step of selecting a channel associated with the strongest synchronization match.

7. The method according to claim 1, in which the method comprises the further step of controlling a timing oscillator of the mobile equipment using the derived timing information.

8. The method according to claim 1, in which the method comprises the further step of deriving cell parameters based on the timing information.

9. The method according to claim 1, the method being applied in a UTRA-TDD system or in a TD-SCDMA system.

10. A mobile equipment for use in a CDMA system, comprising:
    a processing means;
    a memory means; and
    a transceiver means for receiving and transmitting CDMA signals, the memory means and the transceiver means being coupled to the processing means, the processing means prior to synchronizing with a base station further comprising:
    means for scanning a base radio signal transmitted from the base station during at least one frame to detect a signal portion with predetermined characteristics, one of the characteristics being received signal strength, the characteristics excluding a synchronization code;
    means for deriving timing information associated with the CDMA system from the signal portion; and
    means for starting synchronization with the base station using the timing information to perform a search to match the synchronization code in a synchronization time slot, wherein:
       the signal portion is the received power of the base station signal as received by the mobile equipment; or
       the signal portion is a guard period of the base station signal.

11. A computer readable medium encoded with software which is loadable on mobile equipment having processing means, the software comprising instructions to allow the processing means prior to synchronizing with a base station to:
    scan a base radio signal transmitted from the base station during at least one frame to detect a signal portion with predetermined characteristics, one of the characteristics being received signal strength, the characteristics excluding a synchronization code;
    derive timing information associated with the CDMA system from the signal portion; and
    start synchronization with the base station using the timing information to perform a search to match the synchronization code in a synchronization time slot, wherein:
       the signal portion is the received power of the base station signal as received by the mobile equipment;
       the signal portion is a guard period of the base station signal.

* * * * *

UNITED STATES PATENT AND TRADEMARK OFFICE
CERTIFICATE OF CORRECTION

PATENT NO. : 7,710,940 B2  Page 1 of 1
APPLICATION NO. : 10/492627
DATED : May 4, 2010
INVENTOR(S) : Van Der Wal et al.

It is certified that error appears in the above-identified patent and that said Letters Patent is hereby corrected as shown below:

On Page 2, in Field (56), under "U.S. PATENT DOCUMENTS", in Column 1, Line 4, delete "2002/1009770 *" and insert -- 2002/0097705 A1 * --, therefor.

In Column 4, Line 53, delete "1." and insert -- 11. --, therefor.

Signed and Sealed this

Twenty-ninth Day of June, 2010

David J. Kappos
*Director of the United States Patent and Trademark Office*